Figure 1:
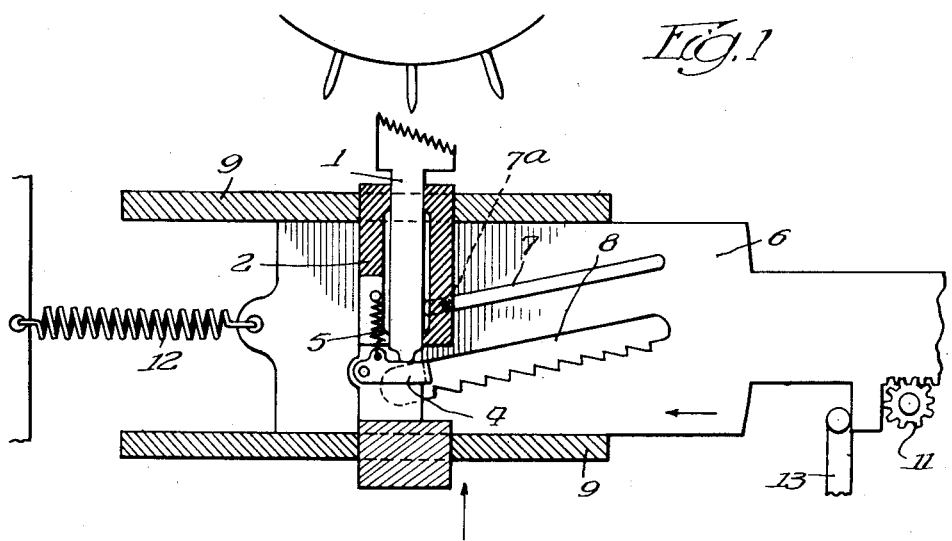

June 12, 1951   L. POILLEVEY   2,556,660
REGISTERING DEVICE FOR SCALES
Filed Aug. 6, 1947

Inventor
Léon Poillevey
By Spencer, Margall, Johnston & Cook
Attys.

Patented June 12, 1951

2,556,660

UNITED STATES PATENT OFFICE 2,556,660

REGISTERING DEVICE FOR SCALES

Leon Poillevey, Grenoble, France, assignor to U. S. Slicing Machine Company, Inc., a corporation of Indiana Application August 6, 1947, Serial No. 766,520
In Great Britain June 24, 1939

Section 1, Public Law 690, August 8, 1946
Patent expires June 24, 1959

9 Claims. (Cl. 265—5)

This invention relates to the control of recording or registering mechanism (for convenience hereinafter referred to merely as recording mechanism) for weighing apparatus, by which is meant apparatus adapted to effect measurements by weighing operations. Especially the invention is concerned with that form of control means for recording mechanism (hereinafter referred to as control means of the form stated) which has weight-responsive measuring means and feeler means investigating said measuring means and giving a varying response depending upon the weight-responsive movement undergone by the measuring means. Such a feeler means is used to control, in accordance with its response, the transmission of appropriate values to the recording mechanism. The present invention is not particularly concerned with the specific form of the recording mechanism which may, for example, give a printed or like permanent record, or a visual indication of the measurement or total of a series of measurements, or a combination of these.

According to the invention there is provided recording mechanism control means comprising a weight-responsive measuring element and a feeler device which are mutually engaged to effect investigation of the weighing response of said element, by actuating means operative to cause relative investigation movement of said device and element, wherein said actuating means is rendered inoperative as regards continuing to apply an engaging force to said device and element following upon engagement between these parts, and at the same time said engagement is maintained.

Further according to the invention there is provided recording mechanism control means comprising a weight-responsive measuring element and a feeler device which are mutually engaged to effect investigation of the weighing response of said element, by actuating means operative to cause relative investigation movement of said device and element, said engagement being maintainable for a period, wherein means, for example a yieldable coupling in the actuating means, is provided which limits the engagement force applied to the device and element by the actuating means to a value less than would otherwise be applied by said actuating means, thereby permitting the use of actuating means operating with a considerable force without subjecting the said device and element to the whole of said force.

In further accordance with the invention there is provided recording mechanism control means comprising one or more measuring elements movable in a weight-responsive manner, one or more feelers to investigate said measuring element or elements, actuating means movable to cause relative investigation movement of a measuring element and its feeler, and a yieldable transmission coupling in said actuating means to limit the value of the engaging force between said feeler and measuring element, said actuating means being blocked in its movement when the respective feeler exerts a force on the measuring element sufficient to cause the coupling to yield, the feeler remaining in engagement with the measuring element but not having further engaging force applied to it by the actuating means due to the blocking of the latter.

The movement of the means for causing the investigation movement may be effected, for example, by powerful springs or electromagnets.

By virtue of the invention the action of a feeler device is rendered more reliable, due to the possibility of using a considerable operating force without substantial shocks or pressure being transmitted to weight-responsive elements in the recording mechanism, and thence to the delicate mechanism of the weighing apparatus, for instance, to the spindle of the pointer-index or to the bearings for the spindle, which is usually also the spindle for such weight responsive-elements.

Indeed, it is believed that with a properly designed construction, the present invention should enable such shocks and pressure as are transmitted to be reduced to a minimum.

The feeler mechanisms need not be especially light, nor need be the springs (if such are employed) for moving them, so the danger is obviated or minimized of the feelers being caused to stick, due to dust for example, or of moving so slowly as to give rise to inaccurate recording.

Figure 2:
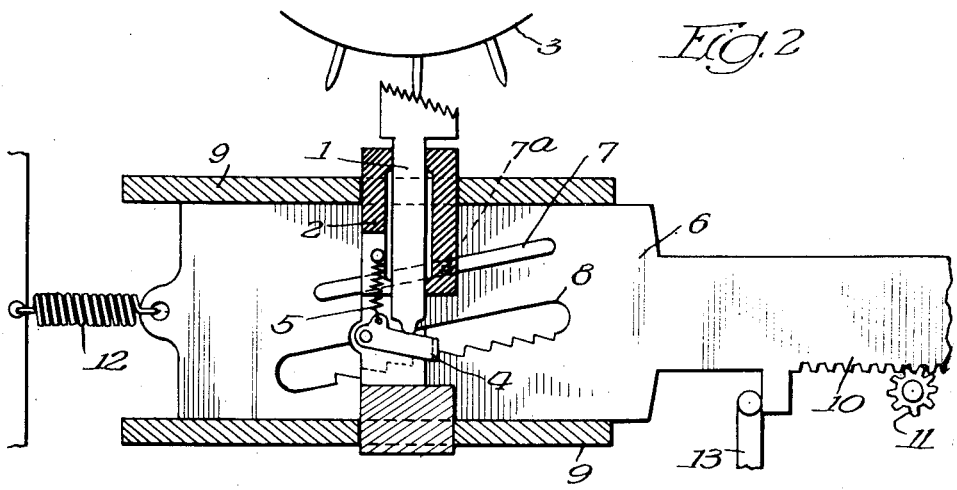

In order that the invention may be clearly understood and readily carried into effect reference will now be made to the example of construction illustrated in the accompanying drawings, in which Figure 1 is a partly sectional side elevation of a feeler and operating mechanism therefor constructed according to the invention, the feeler being in section, and Figure 2 is a similar view to Figure 1, but shows the feeler in the investigating position.

Referring to the drawings, the feeler consists of two parts 1, 2, which are yieldably interconnected to allow slight relative movement between the parts. The part 2 comprises a sleeve for a shank of the other part 1, and the latter part has a head to engage with the weight-responsive or "measuring" element 3. In the construction illustrated, the feeler is arranged for radial investigation-movement.

The yieldable interconnection between the feeler parts 1, 2 is provided by a detent 4 loaded by a light spring 5, the detent being pivoted to the sleeve part 2 and the shank of the other part 1 bearing on the detent, which being resiliently loaded urges said part 1 to the position shown in Figure 1. Relative movement between the parts 1, 2, results from a pressure greater than the resilient loading of the detent 4, and said loading need only be sufficient to uphold the shanked feeler-part 1.

The investigation movement of the feeler 1, 2, is forcibly caused by a ram 6 which moves transversely to the radial direction. Movement is transmitted to the feeler 1, 2, by an inclined cam-slot 7 on the ram that is engaged by a follower 7a on the sleeve-part 2 of the feeler.

Blocking of the ram 6 upon interengagement between the feeler part 1 and the weight-responsive measuring element 3 is produced by yielding of the inter-connection between the feeler parts 1, 2, allowing a slight relative movement. This movement depresses the detent 4 pivoted on the feeler part 2 and causes said detent to engage with a rack 8 on the ram 6. The feeler 1, 2, being supported by guides 9 (which in this case also guide the ram) which prevent transverse movement of the feeler 1, 2, the ram 6 is thus blocked against further movement.

To permit immediate interengagement between the detent 4 and the rack 8 irrespective of the relative positions of the feeler 1, 2, and the ram 6, the rack 8 is inclined parallel to the cam-slot 7 on the ram.

The feeler part 2 which is immediately moved by the ram does not engage with the weight-responsive element at all.

The ram is employed to produce movement of a suitable record-forming or registering element, with the particular form of which the present invention is not concerned, but which may, for example be a type-bearing element or wheel of a printing device, or a visible element of an indicator, or a totaliser. For that purpose the ram 6 may have a rack portion 10 actuating a pinion 11.

In the construction illustrated, the movement of the ram 6 is derived from a relatively strong spring 12 which operates the ram when the latter is released by a stop 13, which serves to control initiation of the investigation and recording operation. The ram 6 may, of course, be moved by any other convenient form of power drive, or by manually operated means, instead of by the spring and releasing stop illustrated.

It will be realized that, in practice, there will usually be more than one measuring element 3, and corresponding feelers and operating rams.

It will be noted that, no matter how powerful the operating spring 12, the maximum force engaging the feeler part 1 with the element 3 is that due to the spring 5. For the position illustrated in Figure 2 the ram 6 can no longer apply an engaging force to the feeler 1, 2, since movement of the ram is blocked by the pawl 4; in fact even the spring 5 will no longer apply an engaging force once the pawl 4 has been engaged with the rack 8 and so long as the pawl is held against a step of the rack. In practice, the pawl may be adjusted so that blocking of the ram 6 follows practically instantaneously upon engagement between the feeler 1 and element 3.

What is claimed as new is:

1. A weighing apparatus having a recording mechanism control means embodying a weight-responsive measuring element and a feeler device, which are mutually engaged to effect investigation of the weighing response of said elements, movable actuating means operatively associated with said device to cause relative investigation movement of said device and element, stop means on said actuating means, and a detent on said device cooperating with said stop means upon movement of said actuating means a predetermined distance and rendering said actuating means inoperative as regards continuing to apply an engaging force to said device and element, subsequent to engagement between these parts, while said device and element are maintained in engagement.

2. A weighing apparatus having a recording mechanism control means embodying a weight-responsive measuring element and a feeler device, which are mutually engaged to effect investigation of the weighing response of said element, movable actuating means operatively associated with said device to cause relative investigation movement of said device and element, said engagement being maintainable for a period, stop means on said actuating means, and a detent yieldably mounted on said device thereby forming a yieldable coupling in the said actuating means, said detent cooperating with said stop means to limit movement of said actuating means for limiting the engagement force applied to the said device and element by the actuating means to a value less than would otherwise be applied by said actuating means, thereby permitting the use of actuating means operating with a considerable force without subjecting the said device and element to the whole of said force.

3. A weighing apparatus having a recording mechanism control means embodying one or more measuring elements movable in weight-responsive manner, one or more feelers to investigate said measuring element or elements, actuating means movable to cause relative investigation movement of a measuring element and its feeler, stop means on said actuating means, and a detent on said device cooperating with said stop means and forming a yieldable transmission coupling in said actuating means to limit the value of the engaging force between said feeler and measuring element.

4. A weighing apparatus having a recording mechanism control means embodying one or more measuring elements movable in weight-responsive manner, one or more feelers to investigate said measuring element or elements, actuating means movable to cause relative investigation movement of a measuring element and its feeler, cooperating stop means and a yieldably mounted detent forming a yieldable transmission coupling in said actuating means to limit the value of the engaging force between said feeler and measuring element, and means for blocking said actuating means in its movement when the respective feeler exerts a force on the measuring element sufficient to cause the coupling to yield, the feeler remaining in engagement with the measuring element but not having further engaging force applied by the said actuating means, due to the blocking of the latter.

5. A weighing apparatus having recording mechanism control means embodying one or more measuring elements movable in weight-responsive manner and one or more feeler devices to investigate said measuring element or elements, the feeler of each feeling device embodying a feeling element, and a supporting element by which the feeling element is carried, yieldable connections individual to the feeling elements and between the elements and this support, allowing relative movement therebetween, actuating means for the forcible or positive movement of said supporting element to bring the feeler element into the investigating positon, and a stop device including a yieldably mounted detent set by the relative movement of said feeler and supporting element, upon engagement of the former with the measuring element, to rigidly block further movement of said actuating means, the said feeler remaining in engagement with the measuring element.

6. A weighing apparatus having recording mechanism control means embodying one or more measuring elements movable in weight-responsive manner and one or more feeler devices to investigate said measuring element or elements, the feeler of each feeling device embodying a feeling element and a supporting element by which the feeling element is carried, yieldable connections individual to the feeling elements and between the elements and this support, allowing relative movement therebetween, actuating means for the forcible or positive movement of said supporting element to bring the feeler element into the investigating positon, a stop device adapted to be set by the relative movement of said feeler and supporting element, upon engagement of the former with the measuring element, to rigidly block further movement of said actuating means, the said feeler remaining in engagement with the measuring element, said stop device embodying a resiliently mounted pawl operable by relative movement of the feeler device upon reaching feeling position, and a rack on the feeler actuating member.

7. A weighing apparatus having recording mechanism control means embodying one or more measuring elements movable in weight-responsive manner and one or more feeler devices to investigate said measuring element or elements, the feeler of each feeling device embodying a feeling element and a supporting element by which the feeling element is carried, yieldable connections individual to the feeling elements and between the elements and this support, allowing relative movement therebetween, actuating means for the forcible or positive movement of said supporting element to bring the feeler element into the investigating position, a stop device adapted to be set by the relative movement of said feeler and supporting element, upon engagement of the former with the measuring element, to rigidly block further movement of said actuating means, the said feeler remaining in engagement with the measuring element, said stop device embodying a resiliently mounted pawl operable by relative movement of the feeler device upon reaching feeling position, and a rack on the feeler actuating member, said pawl being mounted upon the supporting element and urging the feeling element to a limiting position from which it is moved upon being pressed against the measuring element.

8. A weighing apparatus having a recording mechanism control means embodying a measuring element movable in weight-responsive means, a feeler device to investigate said measuring element, said feeler embodying a feeling element, a supporting element by which the feeling element is carried, a yieldable pawl pivotally mounted upon the feeler supporting element, upon which pawl said feeler element rests to be supported thereby, said pawl forming a yieldable connection between the feeler element and its support, allowing relative movement therebetween, an actuating member, a pin and slot connection between the actuating member and said feeler element support, for shifting said feeling element support to bring the feeling element into investigating position, and a rack carried by the actuating member to be engaged by said pawl.

9. A weighing apparatus having a recording mechanism control means embodying a measuring element movable in weight-responsive means, a feeler device to investigate said measuring element, said feeler embodying a feeling element, a supporting element by which the feeling element is carried, a yieldable pawl pivotally mounted upon the feeler supporting element, upon which pawl said feeler element rests to be supported thereby, said pawl forming a yieldable connection between the feeler element and its support, allowing relative movement therebetween, an actuating member, a pin and slot connection between the actuating member and said feeler element support, for shifting said feeling element support to bring the feeling element into investigating positon, and a rack carried by the actuating member to be engaged by said pawl, said slot and said rack being disposed in inclined planes, and substantially parallel.

LEON POILLEVEY.

REFERENCES CITED

The following references are of record in the file of this patent:

UNITED STATES PATENTS

| Number | Name | Date |
|---|---|---|
| 1,988,072 | Dependbrock | Jan. 15, 1935 |
| 2,283,149 | Munson | May 12, 1942 |
| 2,286,196 | Butler | June 16, 1942 |